(12) United States Patent
Eguchi et al.

(10) Patent No.: US 6,339,316 B1
(45) Date of Patent: Jan. 15, 2002

(54) EXCITER FOR GENERATOR

(75) Inventors: Takenori Eguchi; Masaru Shimomura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/402,729

(22) PCT Filed: Apr. 9, 1998

(86) PCT No.: PCT/JP98/01645

§ 371 Date: Oct. 12, 1999

§ 102(e) Date: Oct. 12, 1999

(87) PCT Pub. No.: WO99/53606

PCT Pub. Date: Oct. 21, 1999

(51) Int. Cl.[7] ............................................. H02P 9/10
(52) U.S. Cl. ............................ 322/59; 322/28; 363/34
(58) Field of Search ........................ 290/52, 31; 322/10, 322/19, 28, 27, 59; 363/34

(56) References Cited

U.S. PATENT DOCUMENTS

| | | | | |
|---|---|---|---|---|
| 3,764,815 A | * | 10/1973 | Habock et al. | 290/52 |
| 3,818,317 A | * | 6/1974 | Isono et al. | 322/21 |
| 4,326,159 A | * | 4/1982 | Aotsu et al. | 322/19 |
| 4,438,385 A | * | 3/1984 | Sato et al. | 322/28 |
| 4,967,334 A | * | 10/1990 | Cook et al. | 363/34 |
| 5,013,929 A | * | 5/1991 | Dhyanchard | 290/31 |
| 5,015,941 A | * | 5/1991 | Dhyanchand | 322/10 |
| 5,387,859 A | * | 2/1995 | Murugan et al. | 322/10 |
| 5,594,350 A | * | 1/1997 | Koizumi et al. | 324/616 |
| 5,604,420 A | * | 2/1997 | Namba | 322/19 |

* cited by examiner

*Primary Examiner*—Nicholas Ponomarenko
(74) *Attorney, Agent, or Firm*—Leydig, Voit, & Mayer, Ltd.

(57) ABSTRACT

An excitation apparatus for a generator includes an AC/AC inverter having a voltage holding function and connected to an output line of an AC generator. The apparatus includes an AC/DC converter, a capacitor connected to an output of the AC/DC converter, and a DC/AC converter connected to the capacitor and excites a field winding of the generator with an AC/DC converter controllable with a current and connected to the output of the AC/AC inverter. Even when a voltage of the output line is lowered due to a failure in a system, since energy stored in the capacitor is discharged and the voltage is maintained for the time being, the excitation current of the generator can be kept at a sufficiently high value.

9 Claims, 14 Drawing Sheets

EXCITER FOR GENERATOR

TECHNICAL FIELD

The present invention relates to an excitation apparatus for controlling an excitation current that is supplied to a generator.

BACKGROUND ART

In general, of generators for supplying electric power to either a commercial power line or a large-scale house power generation line, the following type excitation apparatus is called as a self-excitation type excitation apparatus and is widely used: an excitation apparatus in which a current is supplied to a field winding of a generator using electric power outputted from this generator.

In this case, since an excitation current needs to be controlled so as to control a generated voltage, generally speaking, the generated voltage is rectified via a controllable AC/DC converter, and a DC current is supplied to a field winding of a generator.

Recently, since, for example, power transmission distance has increased, it is required for a generator to generate a higher ceiling voltage than that of the conventional generator. The reason why the power transmission distance is increased is given as follows. As capacity of a single generator is increased, it is practically difficult to install a power station in the vicinity of a power consuming place. As apparent from the foregoing fact, large output currents and quick response performance with respect to excitation apparatuses (referred to as a "high initial response excitation system") are required.

Currently, static type excitation apparatuses are normally utilized as this high initial response excitation system. This static type excitation apparatus has a superior response characteristic. However, a voltage drop occurring in the primary side of the excitation apparatus is likely to appear as a lowering of output voltage, especially lowering of a ceiling voltage. Since there is a small margin in output voltages, this static type excitation apparatus must be designed by employing extra power to make allowances for this voltage drop, resulting in a waste of performance.

A description will now be made of a conventional static type excitation apparatus.

FIG. 15 is a diagram showing the conventional static type excitation apparatus disclosed in Japanese Patent Application Laid-open No. Sho 64-5400. In this drawing, reference numeral 1 denotes a generator; reference numeral 12 denotes a field winding of the generator 1; reference numeral 2 represents an output line of the generator 1; reference numeral 3 denotes a circuit breaker provided in the generator output line 2; and reference numeral 4 denotes a system bus through which this generator 1 supplies electric power.

Also, reference numeral 5 denotes an excitation transformer connected to the output line 2 of the generator; reference numeral 6 shows a PT for detecting an output voltage of the generator 1; and reference numeral 8 represents an initial excitation circuit used when the generator 1 is first initiated (namely, when the generator is initiated under such a condition that supply of electric power is not received from the system bus 4).

Also, reference numeral 9 denotes a generator voltage adjuster for controlling a thyristor rectifier 10 in such a manner that the output voltage of the PT6 is kept to a predetermined value to control a current of the field winding 12; reference numeral 11 indicates a field switch for protecting a field circuit; and reference numeral 37 denotes a varistor for protecting the field circuit against an overvoltage.

Next, operation of the excitation apparatus of FIG. 5 will now be described with reference to the drawings.

In such a case that while the generator 1 generates the voltage defined in a predetermined range, a load (not shown) connected to the system bus 4 is operated under normal condition and a current defined within the normal range flows, the voltage appearing on the output line 2 of the generator 1 is fed back to the generator voltage adjuster 9 by the PT6. The generator voltage adjuster 9 compares a set voltage value (not shown) with the voltage of the PT6, and controls the current of the field winding 12 with the thyristor rectifier 10 in such a manner that a difference between the set voltage value and the PT6 voltage is reduced.

Assuming now that a short circuit, an earth fault, and the like happen to occur in either the system bus 4 or the load (not shown) connected to this system bus 4, the voltage of the system bus 4 is lowered, and furthermore, the voltage appearing on the output line 2 of the generator 1 is also lowered. As a result, the generator voltage adjuster 9 controls the firing angle of the thyristor rectifier 10 in such a manner that a larger current may flow through the field winding 12. However, since the voltage which is applied via the excitation transformer 5 to the thyristor rectifier 10 is also lowered, even when the firing angle is controlled at the maximum angle, the high voltage which could be originally produced by the thyristor rectifier 10 cannot be produced, and the current is not sufficiently increased.

In other words, the voltage variation occurring on the AC input side of the thyristor rectifier 10 may give no less and, moreover, instant adverse influence to the maximum outputtable voltage of this thyristor rectifier 10. When the AC input voltage is lowered, the maximum outputtable voltage is immediately lowered. As a consequence, in a critical case, the system voltage is and, the necessary excitation voltage cannot not output. Apparently, this drawback may be solved if such an excitation apparatus having considerable extra capacity is designed allowing in advance for the voltage drop in the output line 2. If so, then the resulting excitation apparatus is increased in size and is not economical.

The present invention has been made to solve the above-described drawback of the conventional excitation apparatus, and therefore, provides an excitation apparatus for a generator, capable of applying an excitation voltage and also an excitation current, which are required to output a necessary ceiling voltage even when a voltage of the output generator is lowered due to a failure occurring in a power distribution system.

DISCLOSURE OF THE INVENTION

According to one aspect of the present invention, there is provided an excitation apparatus for a generator, which comprises an AC/AC inverter having a voltage holding function and connected to an output line of an AC generator; and an AC/DC converter controllable with a current and connected to an output side of this AC/AC inverter, a DC output side of this AC/DC converter being connected to a field winding of the AC generator.

According to another aspect of the present invention, there is provided an excitation apparatus for a generator, wherein the AC/AC inverter having the voltage holding function comprises: a capacitor connected to the AC/DC converter and the DC output side of the AC/DC converter; and a DC/AC converter connected to the DC output side of the AC/DC converter.

According to still another aspect of the present invention, there is provided an excitation apparatus for a generator, which comprises an AC/DC converter controllable with a current and connected to an output line of an AC generator by a connection cable having an impedance Z, a DC output side of this AC/DC converter being connected to a field winding of the AC generator, characterized by including an AC/AC inverter having a voltage holding function, the output terminal of which is connected to the connection cable having the impedance Z on the side of the AC/DC converter.

According to a further aspect of the present invention, there is provided an excitation apparatus for a generator, wherein the AC/AC inverter having the voltage holding function comprises: an AC/DC converter connected to another power supply line different from the output line of the AC generator; a DC/AC converter connected to a DC output side of this AC/DC converter; and a capacitor connected to an output side of the AC/DC converter.

According to a still further aspect of the present invention, there is provided an excitation apparatus for a generator, which further comprises instead of the AC/AC inverter having the voltage holding function, a bidirectional AC/DC converter and a capacitor connected to a DC side of this bidirectional AC/DC converter.

According to another aspect of the present invention, there is provided an excitation apparatus for a generator, wherein a series circuit constructed of a semiconductor switch and a capacitor is connected in parallel to the field winding.

According to still another aspect of the present invention, there is provided an excitation apparatus for a generator, which further comprises a charging circuit connected via a charging apparatus to a capacitor.

BEST MODE FOR CARRYING OUT THE INVENTION

EMBODIMENT 1

Figure 1:
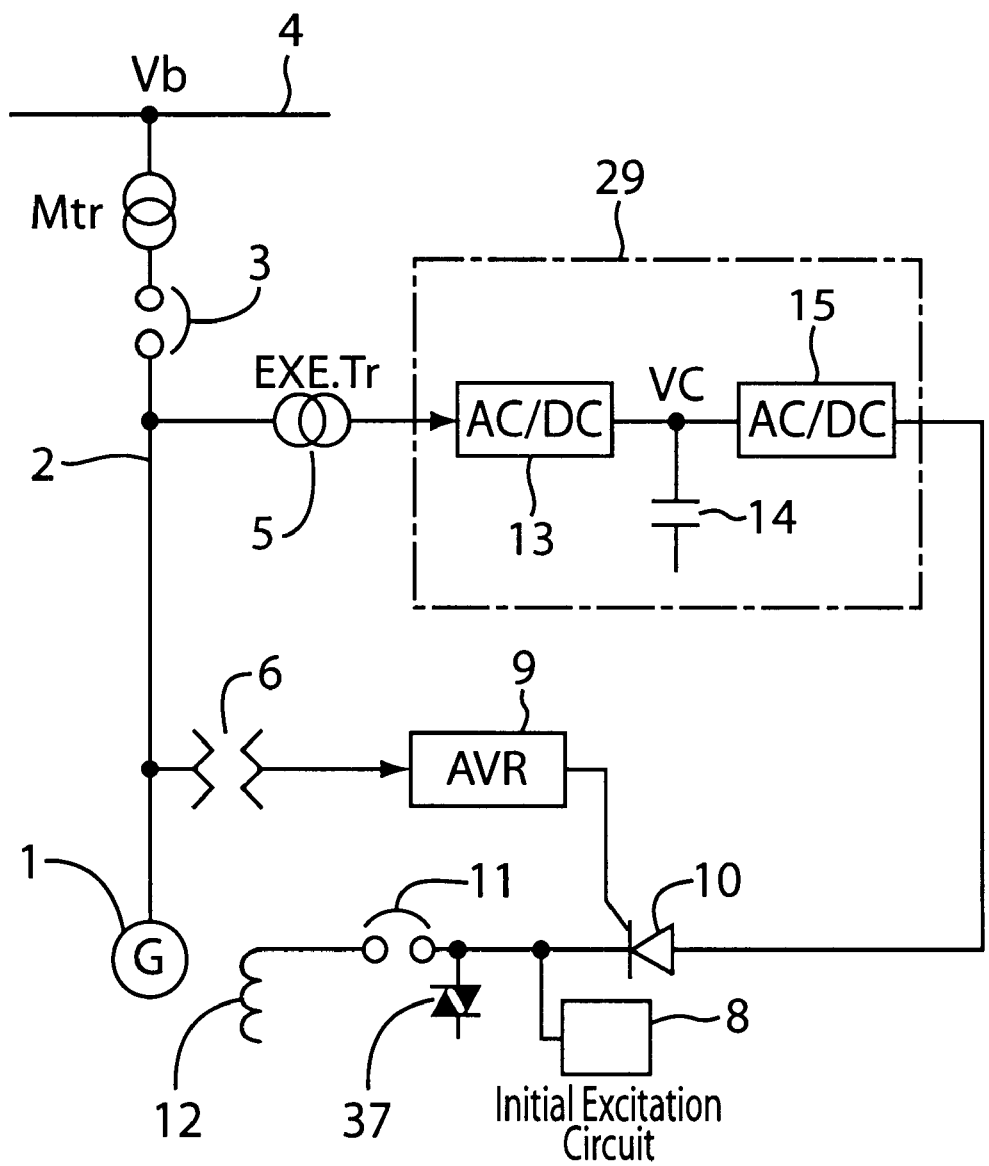
FIG. 1 is a circuit arrangement diagram of an excitation apparatus for a generator according to an embodiment 1 of the present invention.

Referring now to FIG. 1, an embodiment 1 of the present invention will be described below.

FIG. 1 is a circuit arrangement diagram showing an excitation apparatus for a generator according to the present invention. In this drawing, reference numeral 1 denotes a generator; reference numeral 12 denotes a field winding of the generator 1; reference numeral 2 represents an output line of the generator 1; reference numeral 3 denotes a circuit breaker provided in the generator output line 2; and reference numeral 4 denotes a system bus through which this generator 1 supplies electric power.

Also, reference numeral 5 denotes an excitation transformer connected to the output line 2 of the generator; reference numeral 6 shows a PT for detecting an output voltage of the generator 1; and reference numeral 8 represents an initial excitation circuit used when the generator 1 is first initiated (namely, when generator is initiated under such a condition that a supply of electric power is not received from the system bus 4).

Also, reference numeral 9 denotes a generator voltage adjuster for controlling a thyristor rectifier 10 in such a manner that the output voltage of the PT6 is kept to a predetermined value to control a current of the field winding 12; reference numeral 11 indicates a field switch for protecting a field circuit; and reference numeral 37 denotes a varistor for protecting the field circuit from an overvoltage. It should be noted that the thyristor rectifier 10 corresponds to a current controllable AC/DC converter as defined in the present invention.

Reference numeral 13 indicates an AC/DC converter for converting AC derived from the excitation transformer 5 into DC. This AC/DC converter may be replaced by a simple rectifying apparatus, or a controlled rectifier capable of controlling a voltage. Reference numeral 14 shows a capacitor (hereinafter, referred to as link capacitor) having a large capacitance connected to the DC output side of the AC/DC converter 13, and this capacitance will be explained later. Reference numeral 15 denotes a DC/AC converter for converting the DC output voltage of the AC/DC converter 13 into an AC voltage. It is preferable to employ such a DC/AC converter capable of outputting a constant voltage. This AC voltage and the frequency thereof are such an AC voltage/frequency by which the thyristor rectifier 10 can be operated without any problem. The AC/DC converter 13, the capacitor 14, and the DC/AC converter 15 constitute an AC/AC converter 29 having a voltage holding function as defined in the present invention.

In general, of the cases in which the voltage of the generator 1 is lowered, conceivable ones include a failure occurring on the side of system 4, or in the output line 2 of the generator. In the case of the system having the commercial frequency, the recovery time by the plant after these failures have occurred by the protection apparatus is 4 to 6 cycles.

As the excitation apparatus for the generator, this generator must output the ceiling voltage so as to mitigate the voltage reduction of the system during at least the above-explained 6 cycles until the failure can be recovered. The output voltage of the AC/DC converter 13 is also lowered in conjunction with the voltage reduction of the system. However, in this case, since electric charge stored in the link capacitor 14 is discharged, the voltage reduction may be slowed.

Assuming now that an apparent resistance as viewed from the link capacitor 14 to the side of the DC/AC converter 15 is "R" and the capacitance of the link capacitor is "C", this voltage reduction is advanced based upon a time constant of RC. Assuming now that the operating voltage margin of the thyristor rectifier 10 is 20% (namely, if there is margin of A% in voltage reduction on the AC input side of thyristor rectifier 10), the capacitance of the link capacitor may be selected by satisfying the following relationship:

$RC \times (A/100) >$ time period of 6 cycles, where:

R is nearly equal to:

(voltage when link capacitor 14 is operated under normal condition)/(input current when DC/AC converter 15 is operated under normal condition).

EMBODIMENT 2

Figure 2:
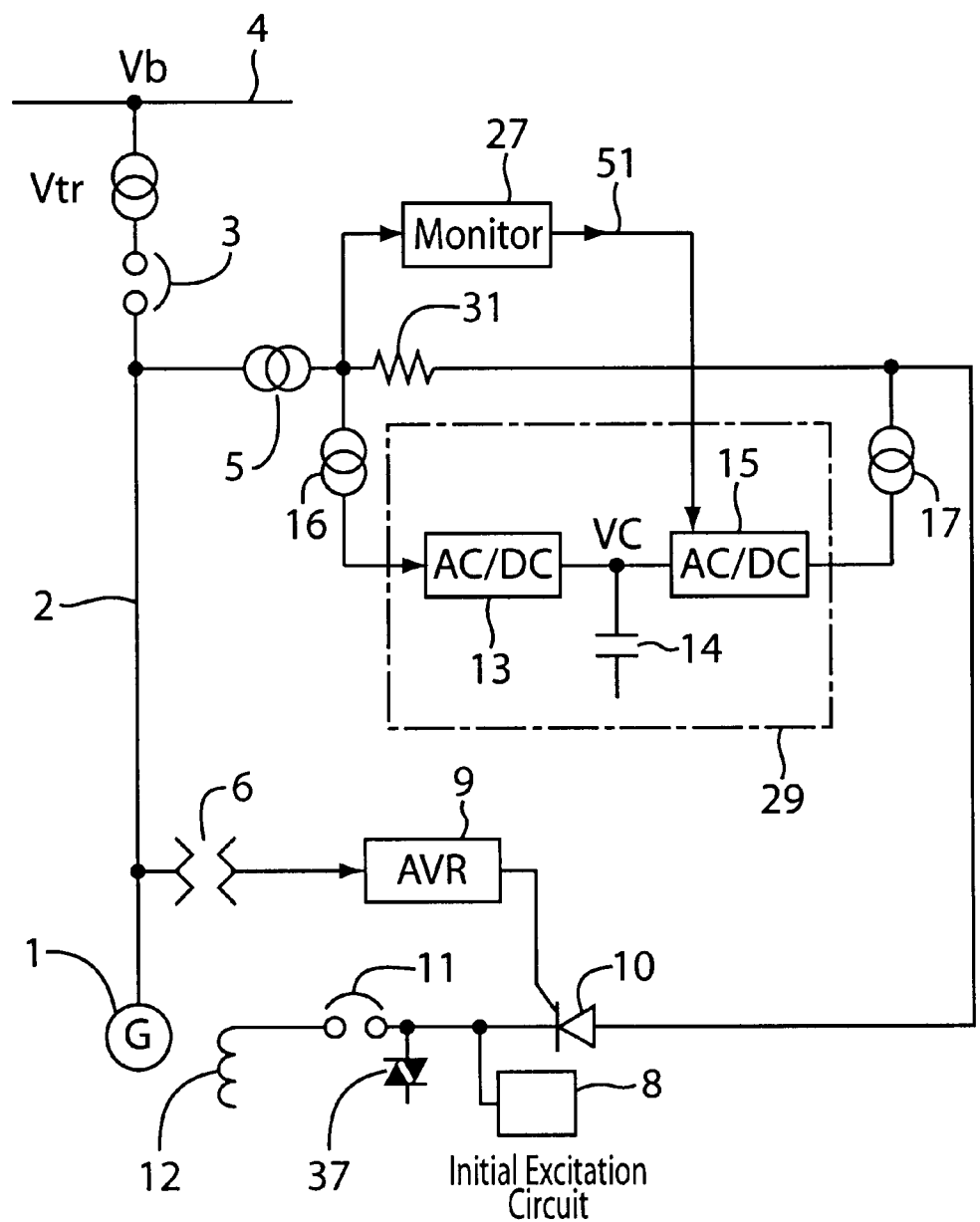
FIG. 2 is a circuit arrangement diagram of an excitation apparatus for a generator according to an embodiment 2 of the present invention.

A circuit arrangement of an embodiment 2 of the present invention is shown in FIG. 2.

It should be noted that the same reference numerals shown in FIG. 1 will be employed as those for denoting the same, or corresponding circuit portions illustrated in this drawing, and detailed explanations thereof are omitted. Reference numeral 16 shows an auxiliary transformer provided on the input side of the AC/DC converter 13, and reference numeral 17 shows a step-up transformer provided on the output side of the DC/AC converter 15. Also, reference numeral 31 denotes an equivalent impedance of a cable used to connect the excitation transformer 5 to the thyristor rectifier 10. The auxiliary transformer 16 is connected to the side of the excitation transformer 5 of the above-described equivalent impedance 31, whereas the step-up transformer 17 is connected to the side of the thyristor rectifier 10 of the above-described equivalent impedance 31. Reference numeral 27 is a monitor apparatus for monitoring the output voltage of the excitation transformer 5, and for producing a signal 51 used to control the DC/AC converter 15 when this output voltage is extremely lowered. This signal 51 causes, when the system is operated under normal condition, the output current of the DC/AC converter 15 become nearly zero, or the operation of the DC/Ac converter to be.

In the case of FIG. 2, while the system is operated under normal condition (namely, there is no abnormal condition in system), the voltage is directly applied from the excitation transformer 5 to the thyristor rectifier 10, whereas when the voltage appearing on the output line 2 is lowered, the voltage is applied from the link capacitor 14 via the DC/AC converter 15 to the thyristor rectifier 10. There is no adverse influence even when an AC/AC inverter circuit 29 having the voltage holding function during the normal operation is out of order. It is needless to say that the DC/AC converter 15 of FIG. 2 is arranged in such a way that this DC/AC converter 15 can output a voltage having a phase coincident with that of the output voltage of the excitation transformer 5.

EMBODIMENT 3

Figure 3:
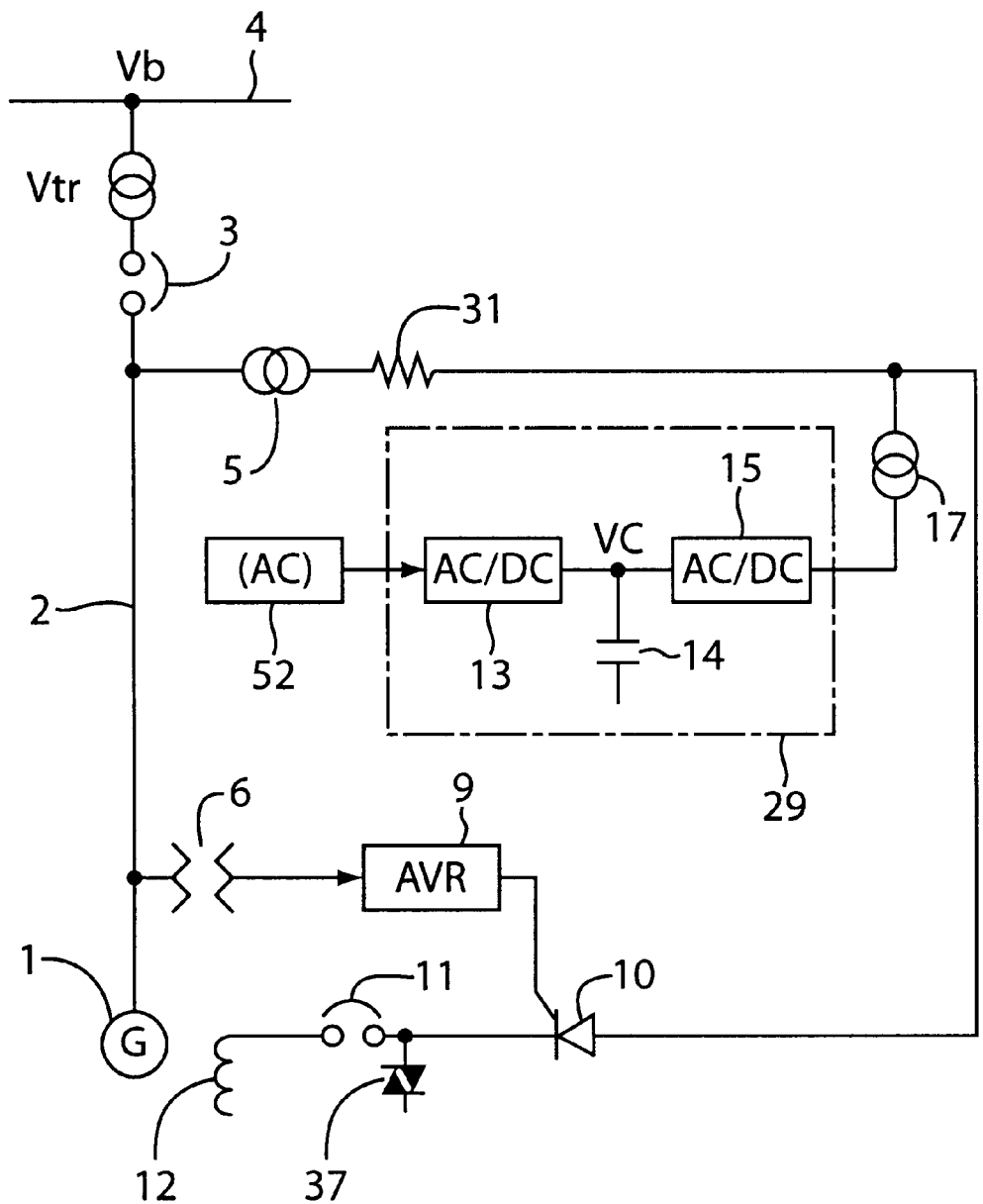
FIG. 3 is a circuit arrangement diagram of an excitation apparatus for a generator according to an embodiment 3 of the present invention.

A circuit arrangement of an embodiment 3 of the present invention is shown in FIG. 3.

In this drawing, although the monitor apparatus 27 is omitted, this monitor apparatus 27 is employed in a similar manner to that of FIG. 2. Reference numeral 52 denotes a separately excited power supply apparatus (for example, house AC power supply installed in a power station). Since the power supply of the AC/DC converter 13 is received from this separately excited power supply apparatus, the below-mentioned merits are achieved:

1) Since this separately excited power supply may be used in the first initial excitation when the generator is initiated, the initial excitation circuit 8 drawn in FIG. 2 of the embodiment 2 may be omitted.
2) When the voltage of the house AC power supply 52 is set to be higher than the voltage of the excitation transformer 5, or this voltage of the house AC power supply 52 is boosted by the step-up transformer 17 provided on the side of the AC/AC inverter circuit 29, a higher ceiling voltage can be produced.
3) Since only the output side of the AC/AC converter circuit 29 is connected on the output side of the excitation transformer 5, the adverse influence caused by trouble in the AC/AC converter circuit 29 can be hardly given, and thus the reliability can be improved.

EMBODIMENT 4

Figure 4:
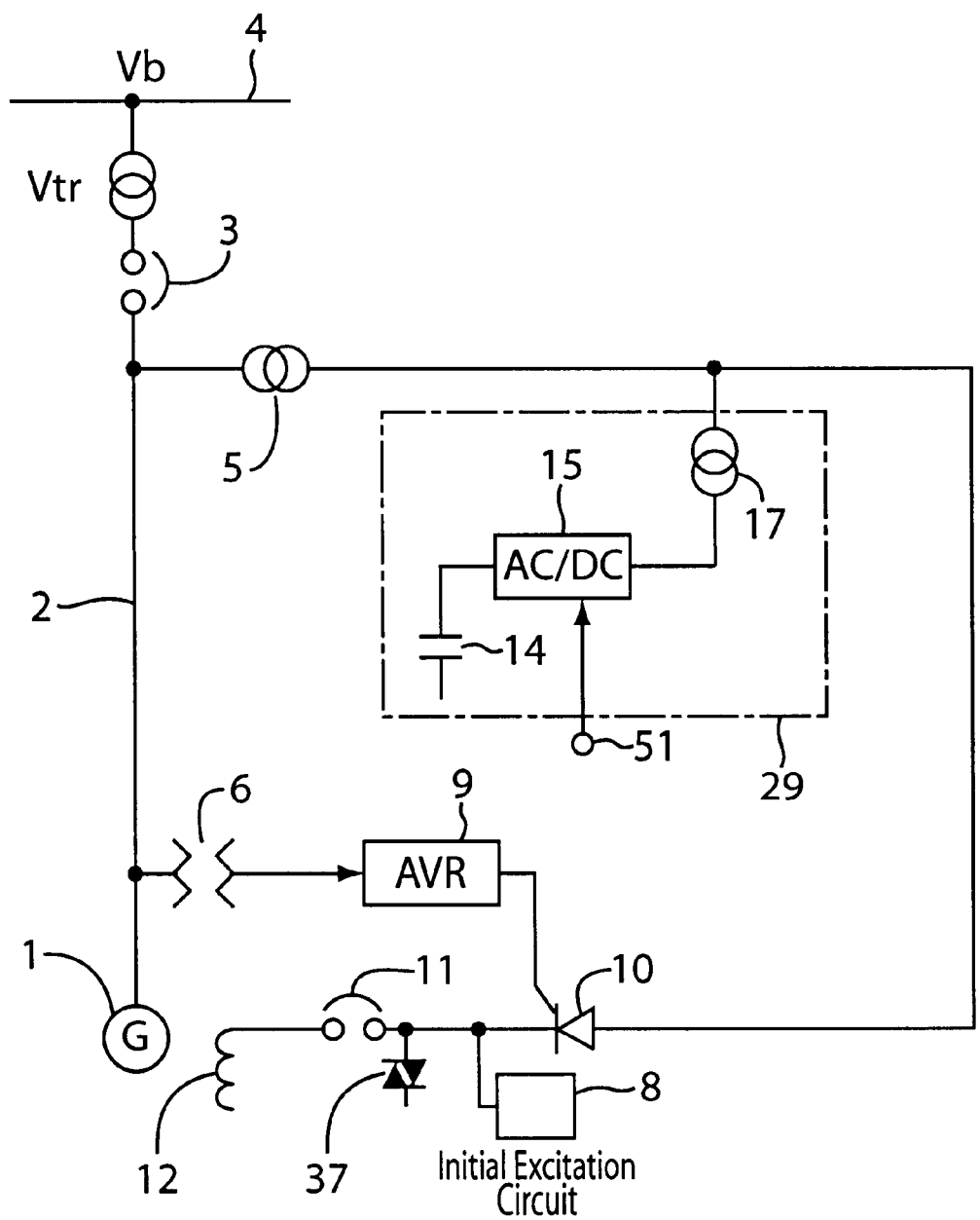
FIG. 4 is a circuit arrangement diagram of an excitation apparatus for a generator according to an embodiment 4 of the present invention.

FIG. 4 shows an arrangement of an excitation apparatus for a generator according to an embodiment 4 of the present invention.

In this drawing, reference numeral 35 denotes a bidirectional DC/AC converter operable along both directions, namely a DC/AC converter capable of performing a regenerative operation.

During the normal operation, electric power supplied from the step-up transformer 17 is converted into DC by the bidirectional DC/AC converter 35 so as to charge the link capacitor 14. Then, when a voltage appearing across a secondary winding side of the excitation transformer 5 is lowered due to a failure occurring in the system, the energy of the link capacitor 14 is returned to the step-up transformer 17 by way of the regenerative control, so that the voltage is maintained. Since the impedance 31 is included, though not shown, in the excitation transformer 5 and the wiring lines connected to the secondary winding thereof, there is no risk that the output voltage of the DC/AC converter 35 will be extremely lowered by the dropping voltage of the system, and therefore, a sufficient voltage can be applied to the thyristor rectifier 10.

In response to the signal 51 indicative of trouble in the system, the DC/AC converter 35 switches the normal DC constant voltage output operation to the AC constant voltage output operation along the reverse direction. Alternatively, for example, the DC/AC converter 35 may be operated by utilizing as a trigger a voltage reduction appearing in the primary winding of the step-up transformer 17.

Since the excitation apparatus for the generator shown in FIG. 4 requires a small number of converters, as compared with those of the excitation apparatus indicated in FIG. 1 to FIG. 3, this excitation apparatus is economical and also is improved in reliability.

EMBODIMENT 5

Figure 5:
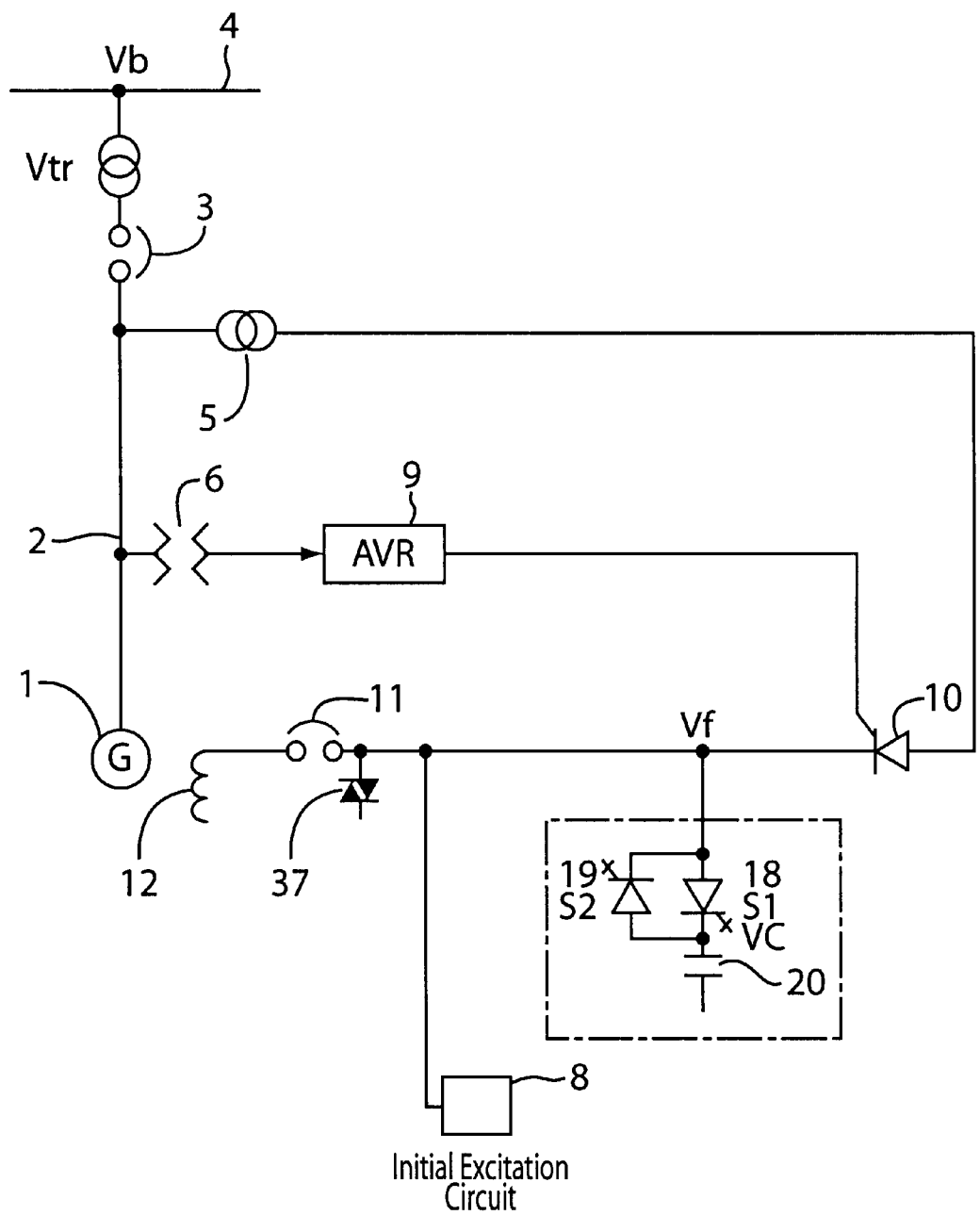
FIG. 5 is a circuit arrangement diagram of an excitation apparatus for a generator according to an embodiment 5 of the present invention.

FIG. 5 shows an arrangement of an excitation apparatus for a generator according to an embodiment 5 of the present invention.

In this drawing, reference numeral 18 denotes a switch S1 with the use of a high-speed switching element (for example, a self-extinction type element such as a so-called "GTO"). Reference numeral 19 denotes another switch S2 similarly employing a high-speed switching element. This switch S2 and the switch S1 have an antiparallel-connection. Reference numeral 20 denotes a charging capacitor; symbol "Vf" denotes a voltage indicative of the output voltage of the thyristor rectifier 10, for the sake of an easy explanation; and symbol "Vc" denotes a terminal voltage of the capacitor 20.

While the voltage relationship of Vc<Vf is maintained under normal operation, the switch S1 (18) is closed so as to charge the capacitor 20.

When a failure occurs, the switch S2 (19) is turned ON so as to discharge the energy of the capacitor 20 to the field winding 12. With execution of the above-described operations, since the field current of the generator is directly supplied from the capacitor 20 when the ceiling voltage is produced while the failure occurs, there is no adverse influence caused by a delay in firing angle control for the thyristor rectifier 10, and the immediate action of the excitation apparatus can be improved. In this case, the switch S1 (18) may be replaced by a simple diode. Also, a limiting resistor may be series-connected to the switch S1 (18) in order to avoid a delay occurring when the field current is increased by the presence of capacitor 20 in charging the capacitor 20.

Figure 6:
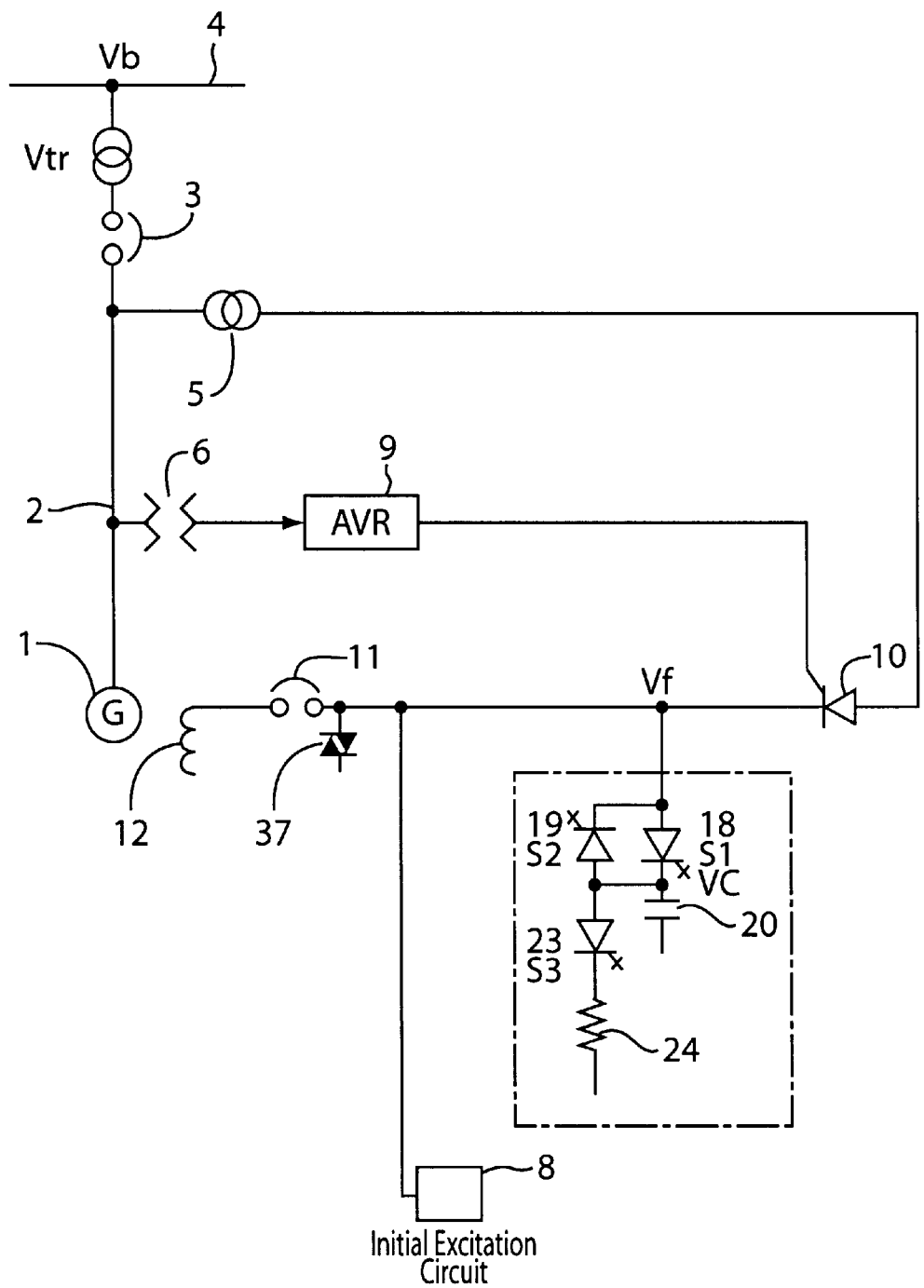
FIG. 6 is a circuit diagram for showing such a case that a modification is made on the circuit arrangement of the excitation apparatus for the generator of FIG. 5.

Also, FIG. 6 shows a circuit arrangement of another excitation apparatus for a generator, from which the varistor 37 is omitted, since a small number of circuits are added to the circuit shown in FIG. 5. In this drawing, reference numeral 23 is a switch S3 (23) using a high-speed switching element, and this switch is connected to one terminal of the capacitor 20. Reference numeral 24 denotes a resistor series-connected to the switch S3 (23). When the field voltage Vf is extremely increased, this increased field voltage Vf is detected by a not-shown voltage detecting circuit. Then, as a first stage, the switch S1 (18) is turned ON, so that the voltage is absorbed by the capacitor 20. If the voltage is further increased even after such a voltage is absorbed by the capacitor 20, then the switch S3 (23) is closed, so that the surge energy is discharged via the resistor 24 so as to suppress the overvoltage. With this arrangement, the varistor 37 can be omitted.

EMBODIMENT 6

Figure 7:
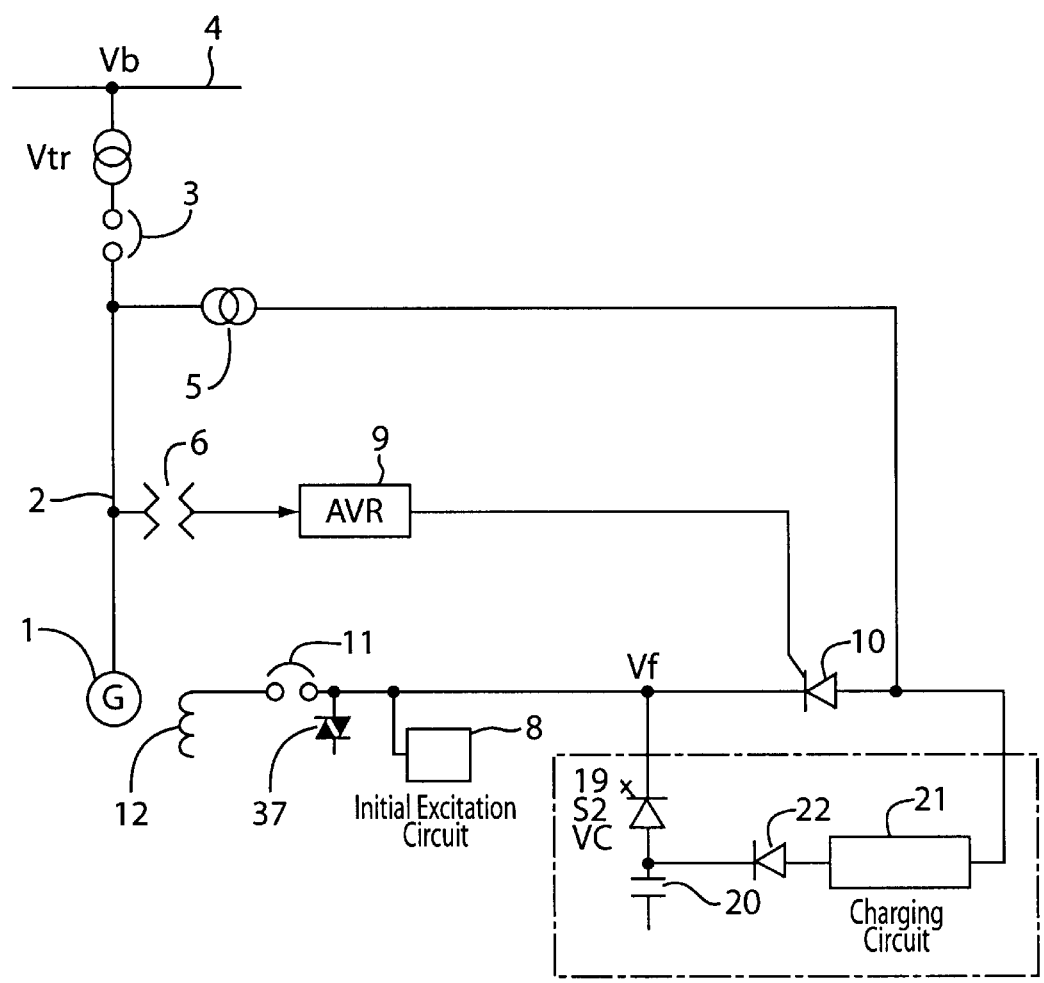
FIG. 7 is a circuit arrangement diagram of an excitation apparatus for a generator according to an embodiment 6 of the present invention.

FIG. 7 shows a circuit arrangement according to an embodiment 6 of the present invention.

In the case of the system of the embodiment 5 shown in FIG. 5, since the charge current to the capacitor 20 is shunted from the circuit for energizing the field system, there is an adverse influence given to the response performance of the field control. In accordance with the system of the embodiment 6 shown in FIG. 7, this adverse influence can be prevented.

In the drawing, reference numeral 21 indicates a charging circuit by which an AC input shunted from the output of the excitation transformer 5 is rectified so as to supply a DC current used to charge the capacitor 20. Reference numeral 22 denotes a diode. Apparently, if the charging circuit 21 has (as most charging circuit do) a function capable of blocking the entry of the DC derived from the output side thereof, the diode 22 may be omitted.

Under normal conditions, the switch S2(19) is turned OFF so as to charge the capacitor 20 with the charging circuit 21, and the thyristor rectifier 10 can control the current of the field winding 12 without having any adverse influence caused by the capacitor 20. When a failure occurs, the switch S2(19) is turned ON so as to discharge the electronic charge of the capacitor 20 to the field winding 12.

Figure 8:
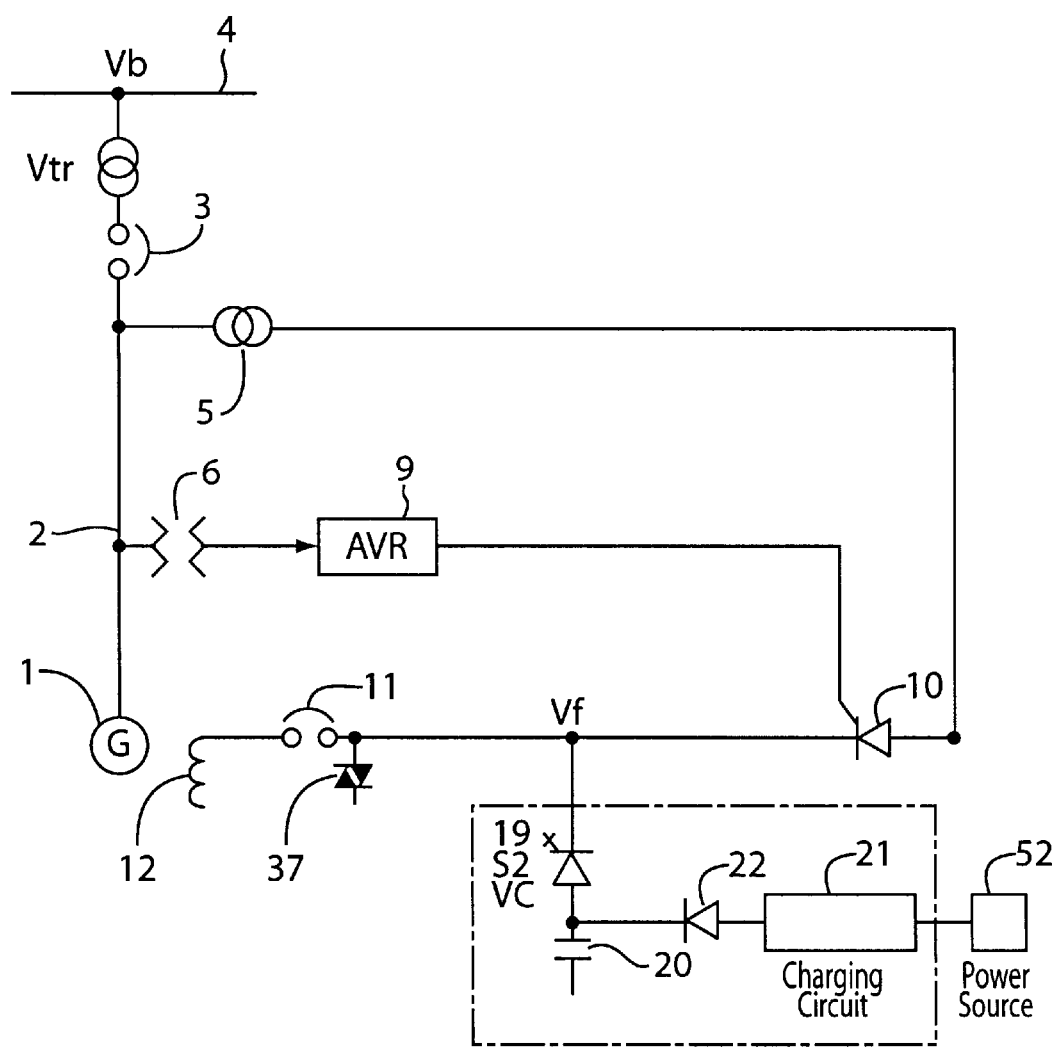
FIG. 8 is a circuit diagram for showing such a case that a modification is made of the circuit of FIG. 7.

It should be noted that when the power is supplied to the charging circuit 21 from the house power supply of the power station, as shown in FIG. 8, the charging circuit 21 may serve also as the initial excitation apparatus 8 (namely, if switch S2 (19) is turned ON under a state in which the thyristor rectifier 10 is stopped, then output of charging circuit 21 may be directly supplied to field winding 12 from a separate power source 52) and thus, the initial excitation circuit 8 is no longer required.

EMBODIMENT 7

Figure 9:
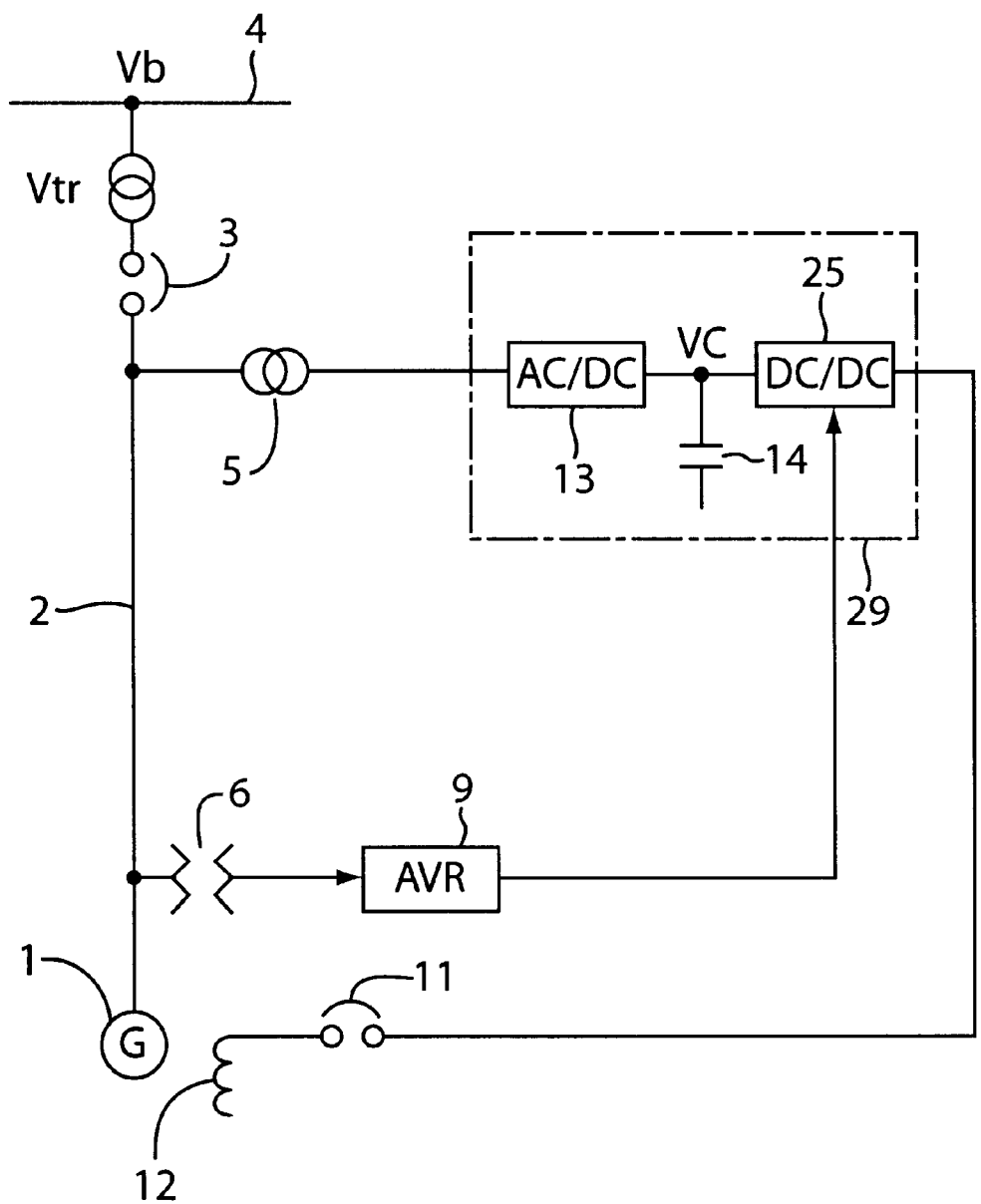
FIG. 9 is a circuit arrangement diagram of an excitation apparatus for a generator according to an embodiment 7 of the present invention.

FIG. 9 shows a circuit arrangement of an excitation apparatus according to an embodiment 7 of the present invention.

In this drawing, reference numeral 25 denotes a DC/DC converter for outputting an output voltage of the AC/DC converter 13 into the field winding 12 as a voltage controlled in accordance with an instruction of the generator voltage adjuster 9.

Since an excitation current is directly outputted from the DC/DC converter 25, the thyristor rectifier 10 is no longer needed.

Operation of the apparatus will next be described.

A voltage at the link capacitor 14 is continuously charged to a sufficiently high value by the AC/DC converter 13.

Even when a voltage appearing at the secondary winding side of the excitation transformer 5 is lowered by a failure occurring in the system, since the link capacitor 14 can supply a voltage higher than, or equal to a minimum DC voltage required for the DC/DC converter 25 to output a necessary voltage for the time being, the DC/DC converter 25 can generate a desired ceiling voltage.

Figure 10:
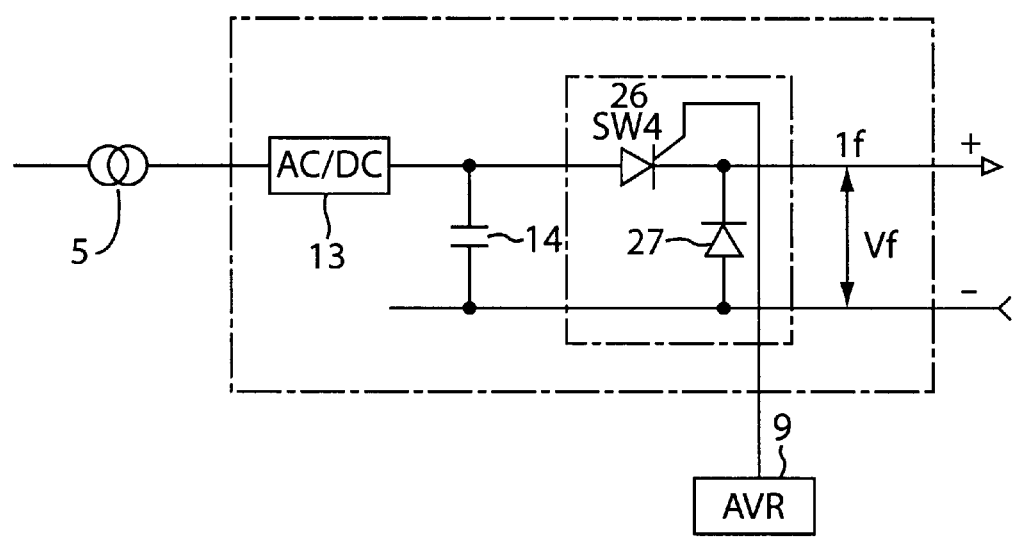
FIG. 10 is a diagram showing a partially detailed circuit arrangement of FIG. 9.
Figure 11:
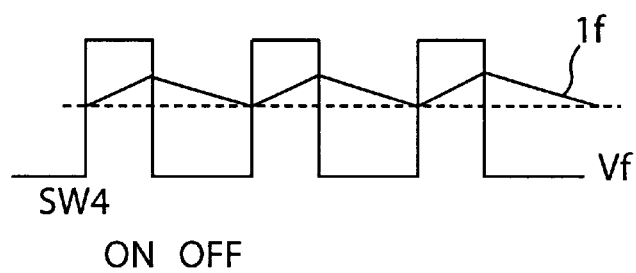
FIG. 11 is a diagram explaining operations of the circuit in FIG. 10.

The circuit of the DC/DC converter 25 is comprised of, for example, a self-extinction type high-speed switch SW4 (26) and a diode 27, as shown in FIG. 10. A field current may be produced by turning ON/OFF the switch SW4 (26) while the excitation apparatus is operated under normal condition, and a waveform of this field current is shown in FIG. 11. Symbol "If" in this drawing denotes the field current.

Figure 12:
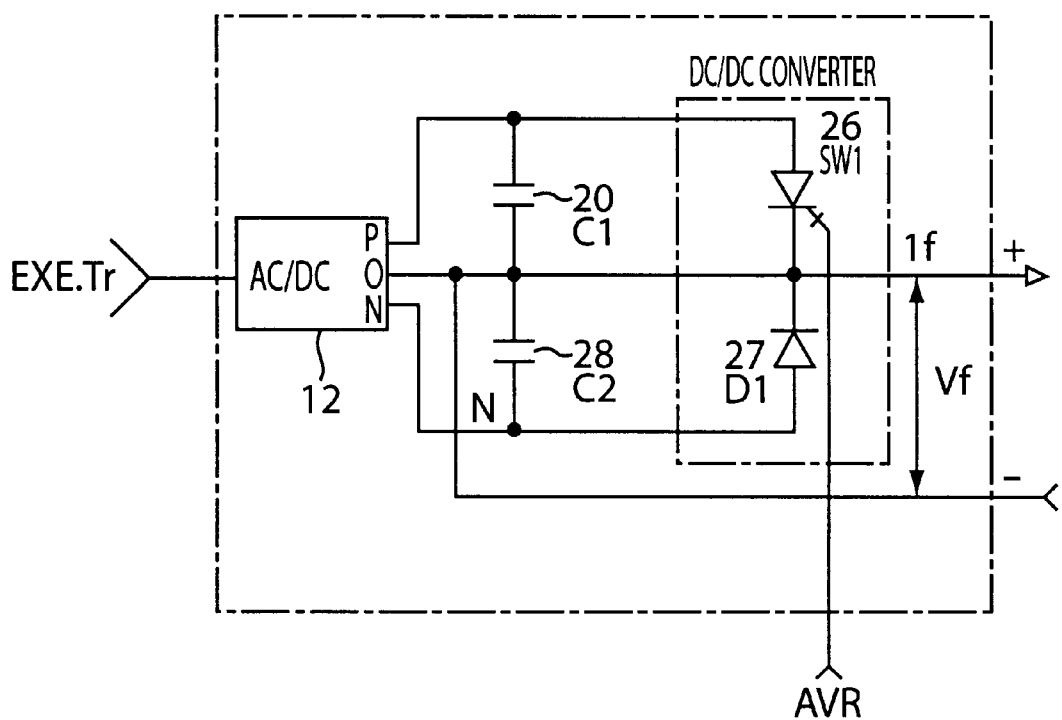
FIG. 12 is a diagram showing a modification example of the partial circuit in FIG. 10.
Figure 13:
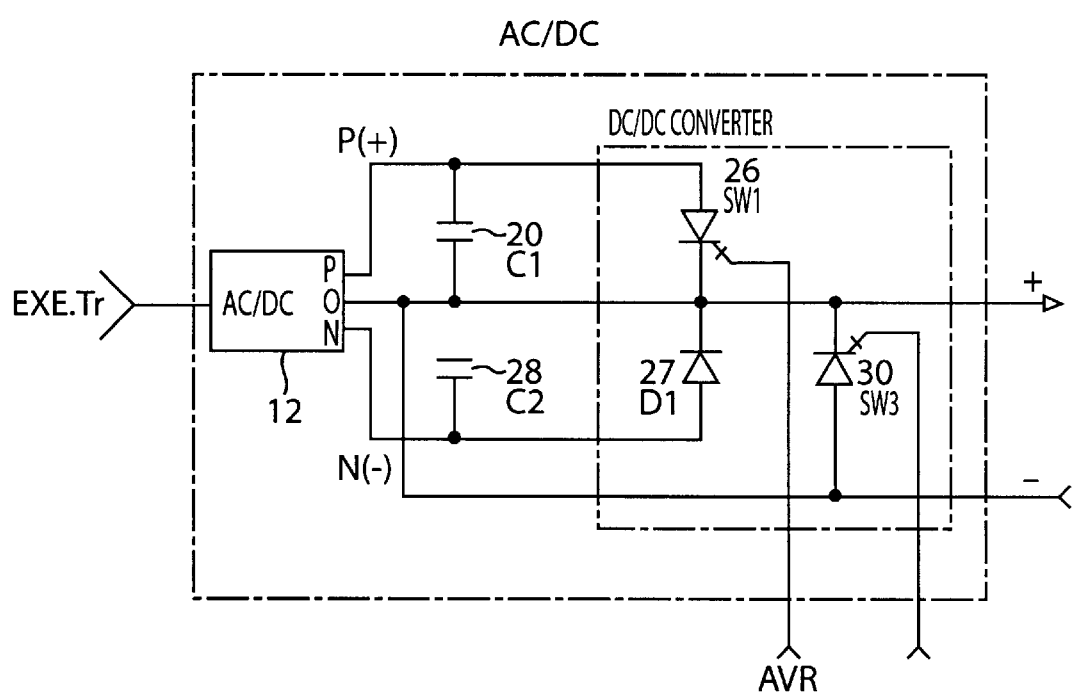
FIG. 13 is a diagram showing a modification example of FIG. 12.

The circuit of FIG. 10 is arranged as shown in this drawing, while a center tap is provided in the AC/DC converter 13 (namely, output voltages are +, 0,− at 3 terminals) as illustrated in FIG. 12. As a result, it is well known that the convergence speed of the field current when the switch SW1 is turned OFF can be improved. In this drawing, a capacitor C1 (20) corresponds to the capacitor (14) of FIG. 10. However, in this circuit, the output voltage becomes (−N) when the switch SW1 is turned OFF. Thus, since there is such a trend that the mean value of the output voltages is lowered, a flywheel switch SW3 (30) may be furthermore employed, as shown in FIG. 13. In such a case that a large change control of the field current is not carried out, the flywheel switch SW3 is continuously turned ON. In the case that the current is required to be rapidly reduced, the switch SW1 is turned OFF, and at the same time, the flywheel switch SW3 is also turned OFF.

With execution of the above-described operation, as the usual output voltage, the high voltage can be readily outputted by way of the switching control between +P and 0V, whereas the current can be rapidly reduced by way of the switching control between +P and −N, if required.

Figure 14:
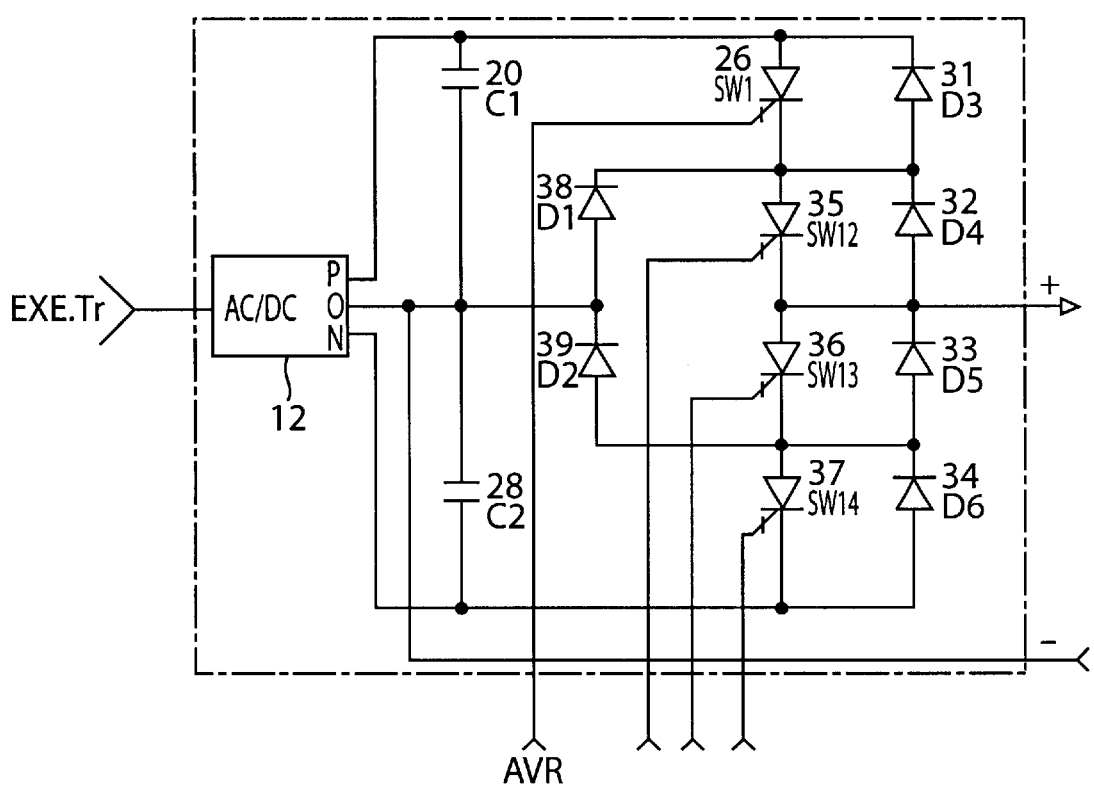
FIG. 14 is a diagram for indicating a modification of FIG. 12.
Figure 15:
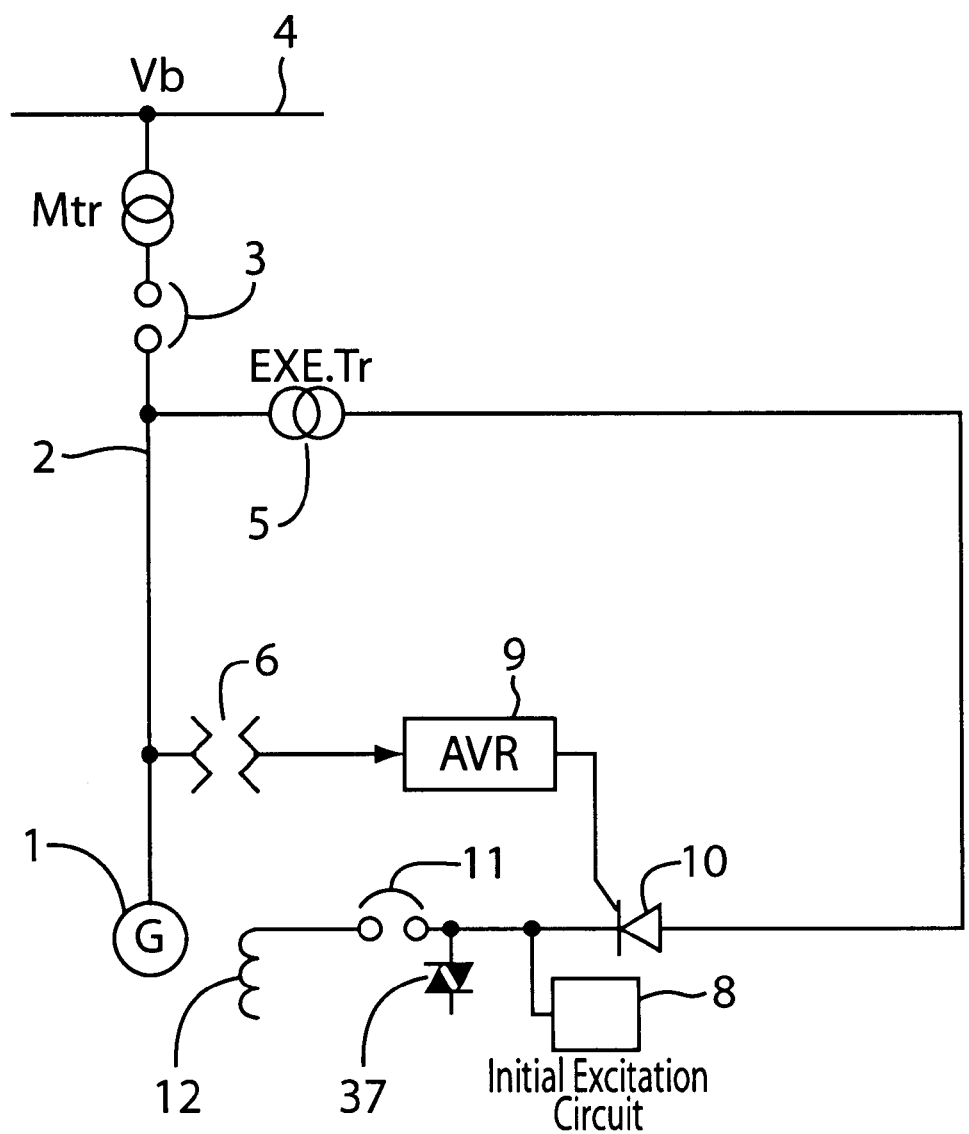
FIG. 15 is a circuit arrangement diagram of a conventional excitation apparatus for a generator.

A circuit of FIG. 14 shows a circuit arrangement for more smoothly switching the control mode executed in FIG. 13.

While the excitation apparatus is operated under normal condition, both the switch SW13 and the switch SW14 are turned OFF, whereas both the switch SW1 and the switch SW12 are turned ON, and a voltage of +P is applied to the field system. Thereafter, when the switch SW1 is turned OFF and the switch SW12 is turned ON, the field voltage becomes 0V.

In rapid demagnetization, while the switch SW1 and the switch SW12 are turned OFF, a negative voltage is applied by a loop constructed of the diodes D5 and D6 so as to attenuate a current. The attenuation speed can be arbitrarily controlled by varying the OFF time of the switch SW1 and also the OFF time of the switch SW12.

INDUSTRIAL APPLICABILITY

The excitation apparatus for the generator, according to the present invention, can be utilized not only for ac generators operated in a commercial power line but also for any type of generators, as long as it is a generator excited by DC.

What is claimed is:

1. An excitation apparatus for a self-excited generator comprising:
    an AC/AC converter having an input side coupled to an output line of an AC generator and comprising:
        an AC/DC converter having an input side coupled to the output line of the AC generator,
        a DC/AC converter having an input side connected to an output side of the AC/DC converter, and
        a capacitor connected at a first terminal to the output side of the AC/DC converter and to the input side of the DC/AC converter, for storing energy;
    a thyristor having a gate, the thyristor being connected between an output side of the AC/AC converter and a field winding of the AC generator;
    a potential transformer coupled to the output line of the AC generator; and
    a generator voltage adjuster connected between the potential transformer and the gate of the thyristor for controlling switching of the thyristor, the AC/AC converter storing electrical energy that is supplied to the thyristor when voltage on the output line decreases, increasing the current supplied to the field winding to counteract decreasing output line voltage.

2. The excitation apparatus according to claim 1, further comprising:
    a connection cable having an impedance Z, coupled at a first end to the output line of the AC generator and connected at a second end to the DC/AC converter; and
    first and second transformers respectively coupling the input and output sides of the AC/AC converter to the first end of the connection cable having the impedance Z and to the thyristor.

3. An excitation apparatus for a generator comprising:
    a bidirectional AC/DC converter having an external terminal coupled to an output line of an AC generator, an internal terminal, and a capacitor connected to the internal terminal;
    a thyristor having a gate, the thyristor being connected between the external terminal of the bidirectional AC/DC converter and a field winding of the AC generator;
    a potential transformer coupled to the output line of the AC generator; and
    a generator voltage adjuster connected between the potential transformer and the gate of the thyristor for controlling switching of the thyristor, the bidirectional AC/DC converter storing electrical energy that is supplied to the current-controlled AC/DC converter when voltage on the output line decreases, increasing the current supplied to the field winding to counteract decreasing output line voltage.

4. An excitation apparatus for a self-excited generator comprising:
    an AC/AC converter having an input side connected to a power source separate from an output line of an AC generator, the AC/AC converter comprising:
        an AC/DC converter having an input side coupled to the output line of the AC generator,
        a DC/AC converter having an input side connected to an output side of the AC/DC converter, and
        a capacitor connected at a first terminal to the output side of the AC/DC converter and to the input side of the DC/AC converter, for storing energy;
    a connection cable having an impedance Z, coupled at a first end to the output line of the AC generator and connected at the second end to an output side of the AC/AC converter;
    a thyristor having a gate, the thyristor being connected between an output side of the AC/AC converter and a field winding of the AC generator;
    a potential transformer coupled to the output line of the AC generator; and
    a generator voltage adjuster connected between the potential transformer and the gate of the thyristor for controlling switching of the thyristor, the AC/AC converter storing electrical energy that is supplied to the thyristor when voltage on the output line decreases, increasing the current supplied to the field winding to counteract decreasing output line voltage.

5. The excitation apparatus for a generator according to claim 4, including a transformer coupling the output side of the AC/AC converter to the AC/DC converter.

6. An excitation apparatus for a generator comprising:
    a thyristor having a gate, the thyristor being coupled at an input side to an output line of an AC generator and connected at an output side to a field winding of the AC generator;
    a potential transformer coupled to the output line of the AC generator;
    a generator voltage adjuster connected between the potential transformer and the gate of the thyristor for controlling switching of the thyristor, and
    a charge storage converter connected in parallel with the field winding of the AC generator, the charge storage converter including a series circuit of a first semiconductor switch and a capacitor connected in series with each other, the series circuit being connected in parallel with the field winding of the AC generator, and a second semiconductor switch connected in anti-parallel with the first semiconductor switch, the first semiconductor switch conducting to store electrical energy in the capacitor and the second semiconductor switch conducting to supply stored electrical energy from the capacitor to the field winding when the current supplied to the field winding decreases, thereby counteracting a decrease in voltage on the output line of the AC generator.

7. An excitation apparatus for a generator comprising:
    a thyristor having a gate, the thyristor being coupled at an input side to an output line of an AC generator and connected at an output side to a field winding of the AC generator;

a potential transformer coupled to the output line of the AC generator;

a generator voltage adjuster connected between the potential transformer and the gate of the thyristor for controlling switching of the thyristor, and a charge storage converter connected in parallel with the field winding of the AC generator, the charge storage converter including a series circuit of a semiconductor switch and a capacitor connected in series with each other, the series circuit being connected in parallel with the field winding of the AC generator, and a charging circuit connected at an output side to a junction of the semiconductor switch and the capacitor for storing electrical energy in the capacitor, the semiconductor switch supplying stored electrical energy from the capacitor to the field winding when the current supplied to the field winding decreases, thereby counteracting a decrease in voltage on the output line of the AC generator.

8. The excitation apparatus for a generator according to claim 7, wherein the charging circuit is coupled at an input side to the output line of the AC generator.

9. The excitation apparatus for a generator according to claim 7, wherein the charging circuit is coupled at an input side to a power source separate from the output line of the AC generator.

* * * * *